(12) United States Patent
Chouai et al.

(10) Patent No.: US 8,153,733 B2
(45) Date of Patent: *Apr. 10, 2012

(54) ELECTROCOAT COMPOSITIONS WITH AMINE LIGAND

(75) Inventors: Abdellatif Chouai, Lake Jackson, TX (US); Timothy S. December, Rochester Hills, MI (US)

(73) Assignee: BASF Coatings GmbH, Münster (DE)

( * ) Notice: Subject to any disclaimer, the term of this patent is extended or adjusted under 35 U.S.C. 154(b) by 660 days.

This patent is subject to a terminal disclaimer.

(21) Appl. No.: 12/344,952

(22) Filed: Dec. 29, 2008

(65) Prior Publication Data

US 2010/0167088 A1  Jul. 1, 2010

(51) Int. Cl.
*C08G 73/02* (2006.01)
*C25D 13/06* (2006.01)

(52) U.S. Cl. ......... 525/540; 528/405; 528/422; 204/489
(58) Field of Classification Search .................. 204/489; 525/540; 528/405, 422
See application file for complete search history.

(56) References Cited

U.S. PATENT DOCUMENTS

| | | | |
|---|---|---|---|
| 4,968,730 A | 11/1990 | Hönig et al. | |
| 4,992,516 A | 2/1991 | Schipfer et al. | |
| 5,039,721 A | 8/1991 | Schwerzel et al. | |
| 5,130,350 A | 7/1992 | Schwerzel et al. | |
| 5,132,378 A | 7/1992 | Schipfer et al. | |
| 5,556,913 A | 9/1996 | Tobinaga et al. | |
| 6,156,823 A * | 12/2000 | Sikora | 523/415 |
| 6,168,868 B1 * | 1/2001 | Hauser et al. | 428/457 |
| 6,214,470 B1 | 4/2001 | Tazzia et al. | |
| 6,369,134 B2 | 4/2002 | Ando et al. | |
| 6,492,027 B2 | 12/2002 | Nishiguchi et al. | |
| 7,008,998 B2 * | 3/2006 | Tazzia et al. | 524/800 |
| 7,087,146 B2 | 8/2006 | Grosse-Brinkhaus et al. | |
| 7,300,963 B2 | 11/2007 | Birnbrich et al. | |
| 2005/0065243 A1 | 3/2005 | Feola et al. | |
| 2006/0280949 A1 | 12/2006 | Shirakawa et al. | |
| 2007/0235318 A1 | 10/2007 | Tazzia et al. | |
| 2008/0102214 A1 | 5/2008 | December et al. | |

FOREIGN PATENT DOCUMENTS

| | | |
|---|---|---|
| DE | 2918610 A1 | 11/1980 |
| JP | 4091170 | 3/1992 |
| JP | 0269367 | 3/2002 |
| JP | 2002201410 | 7/2002 |

* cited by examiner

*Primary Examiner* — Kishor Mayekar
(74) *Attorney, Agent, or Firm* — Harness, Dickey & Pierce, P.L.C.

(57) ABSTRACT

A coating layer prepared from an aqueous electrodeposition coating composition comprising an electrodepositable binder, the binder comprising a tridentate amine ligand-containing resin, and optionally further comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements provides corrosion protection to a metallic substrate.

20 Claims, No Drawings

ELECTROCOAT COMPOSITIONS WITH AMINE LIGAND

FIELD OF THE DISCLOSURE

The invention relates to electrocoat coating compositions, methods of preparing them, methods of electrodeposition of coatings onto a conductive substrate, and electrodeposited coatings.

BACKGROUND OF THE DISCLOSURE

The statements in this section merely provide background information related to this disclosure and may not constitute prior art.

Industrial coating of metal articles that will be used in corrosive environments may include application of one or more inorganic and organic treatments and coatings. Painting systems ("paint shops") in automotive assembly plants are large, complex, and expensive. Metal automotive vehicle bodies (the "body-in-white") and parts, for instance, are given a many-step treatment of cleaning in one or more cleaning baths or spray tanks, application of an aqueous phosphate coating material as a metal pretreatment step in a phosphating bath, then various rinses and additional finishing treatments, such as described in Claffey, U.S. Pat. No. 5,868,820. The phosphating pre-treatment steps are undertaken to improve corrosion resistance of the metal and adhesion of subsequent coatings to the metal. The cleaning and phosphating steps may have 10 or 12 individual treatment stations of spray equipment or dip tanks.

An electrodeposition coating ("electrocoat") is applied after the pretreatment steps to the metal vehicle body. Electrocoat baths usually comprise an aqueous dispersion or emulsion of a principal film-forming resin ("polymer" and "resin" are used interchangeably in this disclosure), having ionic stabilization in water or a mixture of water and organic cosolvent. In automotive or industrial applications for which durable electrocoat films are desired, the electrocoat compositions are formulated to be curable (thermosetting) compositions. This is usually accomplished by emulsifying with the principal film-forming resin a crosslinking agent that can react with functional groups on the principal resin under appropriate conditions, such as with the application of heat, and so cure the coating. During electrodeposition, coating material containing the ionically-charged resin having a relatively low molecular weight is deposited onto a conductive substrate by submerging the substrate in the electrocoat bath and then applying an electrical potential between the substrate and a pole of opposite charge, for example, a stainless steel electrode. The charged coating material migrates to and deposits on the conductive substrate. The coated substrate is then heated to cure or crosslink the coating.

One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anticorrosion effectiveness. The phosphate pre-treatment, however, has up to now been an indispensable step in protecting against corrosion for automotive vehicle bodies.

Certain patent documents describe electrocoat coating compositions containing epoxy resins prepared using diethylenetriamine, examples of which are Grosse-Brinkhaus et al., U.S. Pat. No. 7,087,146; Nishiguchi et al., U.S. Pat. No. 6,492,027; Tobinaga et al., U.S. Pat. No. 5,556,913; and Schwerzel et al., U.S. Pat. No. 5,039,721.

A number of patents disclose using certain metal oxides in electrocoat coating compositions or other metal coatings. Among these are Gros et al., U.S. Pat. Appl. Pub. No. 2006/0058423; (manganese oxide); Poulet et al., U.S. Pat. Appl. Pub. No. 2006/0261311 yttrium, zirconium, lanthanum, cerium, praseodymium and neodymium oxides or salts); Maze et al., U.S. Pat. No. 7,081,157 ($MoO_3$); Matsuda et al., JP 2003226982 (vanadium pentoxide); Mizoguchi et al., JP2003129005 (zinc oxide); and Kawaraya et al., U.S. Pat. Appl. Pub. No. 2007/0149655 (zirconium oxide).

SUMMARY OF THE DISCLOSURE

We disclose a composition and process for electrodepositing an electrocoat coating on a metal substrate, which may be an unphosphated metal substrate (that is, a metal substrate that has not undergone a phosphate pretreatment), in which the electrocoat coating provides excellent corrosion protection.

The process uses an aqueous electrocoat coating composition, also called an electrocoat bath, with a binder comprising a cathodically electrodepositable resin having at least one tridentate amine ligand. In certain embodiments, the electrocoat coating composition also includes a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these. "Tridentate amine ligand" refers to a group having one amine group bonded to the resin and two terminal teriary amine groups; in certain embodiments, the tridentate amine ligand has a structure —N(—R'—$NR_2$)$_2$ in which R' is an alkyl group having from one up to four carbon atoms and optionally having an ether oxygen and each R is independently an alkyl of 1 to 4 carbon atoms. "Resin" is used in this disclosure to encompass resin, oligomer, and polymer. "Binder" refers to the film-forming components of the coating composition. Typically the binder is thermosetting or curable.

In one embodiment, the cathodically electrodepositable resin having at least one tridentate amine ligand also has additional amine groups.

The cathodically electrodepositable resin having at least one tridentate amine ligand may be an epoxy resin or a vinyl (e.g., an acrylic) resin. The tridentate amine ligands of the resin are nucleophilic and are available to coordinate to the metal substrate surface and to the metal oxide, enhancing corrosion resistance of the electrocoat coating. The tridentate amine ligand resin has one or more groups —N(—R'—$NR_2$)$_2$ in which R' is an alkyl group having from one up to four carbon atoms and optionally having an ether oxygen and each R is independently an alkyl of 1 to 4 carbon atoms. In certain embodiments, R' is an ethylene or propylene group and each R is a methyl group.

In certain embodiments, the electrodeposition coating composition binder includes from about 0.01 to about 99% by weight of the tridentate amine ligand-containing resin. Among these embodiments are those in which the electrodeposition coating composition binder includes from about 1 to about 90% by weight of the tridentate amine ligand-containing resin and those in which the electrodeposition coating composition binder includes from about 5 to about 80% by weight of the tridentate amine ligand-containing resin.

In certain embodiments, the electrodeposition coating composition includes from about 0.01 to about 1% by weight of the metal oxide, based on the weight of total binder solids.

In certain embodiments, the binder comprises a crosslinker for the tridentate amine ligand-containing resin. In certain embodiments, the binder comprises a second electrodepositable resin other than the tridentate amine ligand-containing resin. In any of these embodiments, the binder may also comprises a crosslinker which reacts during cure of the electrodeposited coating layer with the tridentate amine ligand-containing resin, the second, electrodepositable resin, or both. In these embodiments, the electrodeposition coating composition binder may include from about 0.01 to about 30% by weight of the tridentate amine ligand-containing resin and from about 40 to about 80% by weight of the second, electrodepositable resin. The electrodeposition coating composition binder may in certain embodiments include from about 1 to about 30% by weight or from about 5 to about 20% by weight of the tridentate amine ligand-containing resin and from about 45 to about 75% by weight or from about 50 to about 70% by weight of the second, electrodepositable resin.

We disclose a method of making an electrocoat coating composition in which a triamine compound having one secondary amine group and two tertiary amine groups is reacted with a resin to provide a resin with a tridentate amine ligand. Amine groups of a binder comprising the resin and a crosslinker are salted with an acid; and the binder is dispersed in an aqueous medium and may be combined with a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements to provide an aqueous electrodeposition coating composition.

We also disclose a method of coating an electrically conductive substrate, such as a metal automotive vehicle body or part, which comprises placing the electrically conductive substrate into an aqueous electrodeposition coating composition having an electrodepositable binder comprising a tridentate amine ligand-containing resin and, using the electrically conductive substrate as the cathode, passing a current through the aqueous electrodeposition coating composition to deposit a coating layer comprising the binder onto the electrically conductive substrate. In certain embodiments, the aqueous coating composition further comprises a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements. The deposited coating layer may then be cured to a cured coating layer. Subsequent coating layers may be applied on the (optionally cured) electrodeposited coating layer. For example, the electrodeposited coating layer may have other layers such as an optional spray-applied primer surfacer and a topcoat layer or topcoat layers (e.g., a colored basecoat layer and a clearcoat layer) applied over the electrodeposited coating layer.

In one embodiment of the method, the electrically conductive substrate is unphosphated before it is coated with an electrodeposited coating comprising the tridentate amine ligand-containing resin; that is, the substrate is free of a phosphate pre-treatment.

In one embodiment of the method, a metal automotive vehicle body is cleaned, and the cleaned metal automotive vehicle body is electrodeposited with an aqueous coating composition comprising the tridentate amine ligand-containing resin and optionally further including a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements. Thus, no phosphate pretreatment is used. The binder of the electrocoat coating composition may include a second, electrodepositable resin that does not have tridentate amine ligands, and generally a crosslinker reactive with one or both resins is included in the coating composition so that the electrodeposited coating layer may be cured.

A coated metallic substrate comprises an electrically deposited coating layer on the substrate, the electrically deposited coating layer comprising a cured coating formed from a binder comprising a tridentate amine ligand-containing resin and optionally further including a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements. In various embodiments, the binder further comprises a crosslinker reactive with the tridentate amine ligand-containing resin, a second, electrodepositable resin, or both that reacts during cure to form the cured coating. The cured coating provides unexpectedly strong resistance to corrosion. The unexpected resistance to corrosion is thought to be due to interactions between the tridentate amine ligands of the resin, the metal oxide, and the metallic substrate. While not wishing to be bound by theory, it is believed that the tridentate amine ligands of the resin interact with both the metal substrate and the metal oxide to enhance the anticorrosive effectiveness of the metal oxide.

"A," "an," "the," "at least one," and "one or more" are used interchangeably to indicate that at least one of the item is present; a plurality of such items may be present. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

A metal substrate, which may be unphosphated, is electrocoated with an aqueous electrocoat coating composition having a binder comprising a tridentate amine ligand-containing resin and optionally further comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these and. In the aqueous electrocoat coating, the binder comprises an electrodepositable resin having acid salted amine groups or amine salted acid groups, which electrodepositable resin includes the tridentate amine ligand-containing resin and may include a second, different resin. The electrodeposited coating layer may be cured and may be overcoated with one or more additional coating layers.

The tridentate amine ligand-containing resin may be prepared using any resin or polymerizable monomer that includes or may be adducted with the tridentate amine ligand. Electrocoat coating binders often include epoxy or acrylic resins, and the tridentate amine ligand-containing resin may, for example, be an epoxy resin, acrylic polymer, or another resin.

The tridentate amine ligand-containing resin may be prepared by reaction of a resin having an epoxide group with a secondary amine of a triamino compound in which one amine is a secondary amine and the other two amine groups are tertiary amines. Alternatively, the tridentate amine ligand-containing resin may be prepared by reaction of a monomer having the epoxide group with the secondary amine group of the triamine compound, then polymerizing the monomer to form the tridentate amine ligand-containing resin. The resin may include a plurality of tridentate amine ligands.

Nonlimiting examples of suitable triamine compounds are those having the formula $HN(\text{---}R'\text{---}NR_2)_2$ in which R' is an alkyl group having from one up to four carbon atoms and optionally having an ether oxygen; each R is independently an alkyl of 1 to 4 carbon atoms. In certain embodiments, R' is an ethylene or propylene group and each R is a methyl group. Particular examples include, without limitation, N'-[(dimethylamino)methyl]-N,N-dimethylmethanediamine, N'-[2-(dimethylamino)ethyl]-N,N-dimethylethylenediamine, N2-[2-(diethylamino)ethyl]-N1,N1-diethyl-1,2-ethanediamine, N2-[2-(dipropylamino)ethyl]-N1,N1-dipropyl-1,2-ethanediamine, N1,N1-dibutyl-N2-[2-(dibutylamino)ethyl]-1,2-ethanediamine, 3,3'-bis-imino(N,N-dimethylpropylamine), N3-[3-(diethylamino)propyl]-N1,N1-diethyl-1,3-propanediamine, N3-[3-(dipropylamino)propyl]-N1,N1-dipropyl-1,3-propanediamine, N1,N1-dibutyl-N3-[3-(dibutylamino)propyl]-1,3-propanediamine, N'-[4-(dimethylamino)butyl]-N,N-dimethyl-1,4-butanediamine, and N4-[4-(diethylamino)butyl]-N1,N1-diethyl-1,4-butanediamine. Combinations of these may be used.

In a first embodiment, the tridentate amine ligand-containing resin is an epoxy resin. The tridentate amine ligand-containing epoxy resin may be prepared by first preparing an epoxy resin by reaction of a polyepoxide with an optional extender and/or optional other reactants such as monofunctional or tri- or higher-functional reactants, optionally including in this reaction step a monomer that provides amine functionality or reacting the product of this reaction step with the triamine that will provide the tridentate amine ligand and optionally a monomer that provides further amine functionality. In a second method, the tridentate amine ligand-containing epoxy resin may be prepared by including the triamine compound providing the tridentate amine ligand in the step of reacting the polyepoxide with an extender or by including the triamine compound providing the tridentate amine ligand in a later step after a polyepoxide-extender product is reacted with a monomer that provides further amine functionality.

Suitable, nonlimiting examples of polyepoxide resins include epoxy resins with a plurality of epoxide groups, such as diglycidyl aromatic compounds such as the diglycidyl ethers of polyhydric phenols such as 2,2-bis(4-hydroxyphenyl)propane (bisphenol A), 2,2-bis(4-hydroxy-3-methylphenyl)propane, 4,4'-dihydroxybenzophenone, dihydroxyacetophenones, 1,1-bis(4hydroxyphenylene)ethane, bis(4-hydroxyphenyl)methane, 1,1-bis(4hydroxyphenyl) isobutane, 2,2-bis(4-hydroxy-tert-butylphenyl) propane, 1,4-bis(2-hydroxyethyl)piperazine, 2-methyl-1,1-bis(4-hydroxyphenyl)propane, bis-(2-hydroxynaphthyl)methane, 1,5-dihydroxy-3-naphthalene, and other dihydroxynaphthylenes, catechol, resorcinol, and the like, including diglycidyl ethers of bisphenol A and bisphenol A-based resins having a structure

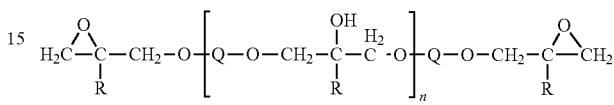

wherein Q is

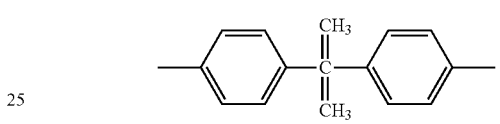

R is H, methyl, or ethyl, and n is an integer from 0 to 10. In certain embodiments, n is an integer from 1 to 5. Also suitable are the diglycidyl ethers of aliphatic diols, including the diglycidyl ethers of 1,4-butanediol, cyclohexanedimethanols, ethylene glycol, propylene glycol, diethylene glycol, dipropylene glycol, triethylene glycol, tripropylene glycol, polypropylene glycol, polyethylene glycol, poly(tetrahydrofuran), 1,3-propanediol, 2,2,4-trimethyl-1,3-pentanediol, 1,6-hexanediol, 2,2-bis(4-hydroxycyclohexyl)propane, and the like. Diglycidyl esters of dicarboxylic acids can also be used as polyepoxides. Specific examples of compounds include the diglycidyl esters of oxalic acid, cyclohexanediacetic acids, cylcohexanedicarboxylic acids, succinic acid, glutaric acid, phthalic acid, terephthalic acid, isophthalic acid, naphthalene dicarboxylic acids, and the like. A polyglycidyl reactant may be used, preferably in a minor amount in combination with diepoxide reactant. Novolac epoxies may be used as a polyepoxide-functional reactant. The novolac epoxy resin may be selected from epoxy phenol novolac resins or epoxy cresol novolac resins. Other suitable higher-functionality polyepoxides are glycidyl ethers and esters of triols and higher polyols such as the triglycidyl ethers of trimethylolpropane, trimethylolethane, 2,6-bis(hydroxymethyl)-p-cresol, and glycerol; tricarboxylic acids or polycarboxylic acids. Also useful as polyepoxides are epoxidized alkenes such as cyclohexene oxides and epoxidized fatty acids and fatty acid derivatives such as epoxidized soybean oil. Other useful polyepoxides include, without limitation, polyepoxide polymers such as acrylic, polyester, polyether, and epoxy resins and polymers, and epoxy-modified polybutadiene, polyisoprene, acrylobutadiene nitrile copolymer, or other epoxy-modified rubber-based polymers that have a plurality of epoxide groups.

The polyepoxide may be provided with the tridentate amine ligand by reaction of an epoxide group of a polyepoxide with three or more epoxide groups with the triamine compound so that the reaction product is left with two unreacted epoxide groups that may be reacted with extender and optional further amine-containing compounds. A monoepoxide may be provided with the tridentate amine ligand by reaction of an epoxide group of a diepoxde with the triamine compound so that the reaction product is left with one unreacted epoxide group.

The polyepoxide (and any optional monoepoxide) may be reacted with an extender to prepare a resin having a higher molecular weight having beta-hydroxy ester linkages. Suitable, nonlimiting examples of extenders include polycarboxylic acids, polyols, polyphenols, and amines having two or more amino hydrogens, especially dicarboxylic acids, diols, diphenols, and diamines. Particular, nonlimiting examples of suitable extenders include diphenols, diols, and diacids such as those mentioned above in connection with forming the polyepoxide; polycaprolactone diols, and ethoxylated bisphenol A resins such as those available from BASF Corporation under the trademark MACOL®. Other suitable extenders include, without limitation, carboxy- or amine-functional acrylic, polyester, polyether, and epoxy resins and polymers. Still other suitable extenders include, without limitation, polyamines, including diamines such as ethylenediamine, diethylenetriamine, triethylenetetramine, dimethylaminopropylamine, dimethylaminobutylamine, diethylaminopropylamine, diethylaminobutylamine, dipropylamine, and piperizines such as 1-(2-aminoethyl)piperazine, polyalkylenepolyamines such as triethylenetetramine, tetraethylenepentamine, pentaethylenehexamine, tripropylenetetramine, tetrapropylenepentamine, pentapropylenehexamine, N,N'-bis(3-aminopropyl)ethylenediamine, N-(2-hydroxyethyl)propane-1,3-diamine, and polyoxyalkylene amines such as those available from BASF AG under the trademark POLYAMIN® or from Huntsman under the trademark JEFFAMINE®. The product of the reaction of polyepoxide and extender will be epoxide-functional when excess equivalents of polyepoxide are reacted or will have the functionality of the extender when excess equivalents of extender are used.

A monofunctional reactant may optionally be reacted with the polyepoxide resin and the extender or after reaction of the polyepoxide with the extender to prepare the epoxy resin. Suitable, nonlimiting examples of monofunctional reactants include phenol, alkylphenols such as nonylphenol and dodecylphenol, other monofunctional, epoxide-reactive compounds such as dimethylethanolamine and monoepoxides such as the glycidyl ether of phenol, the glycidyl ether of nonylphenol, or the glycidyl ether of cresol, and dimer fatty acid.

Useful catalysts for the reaction of the polyepoxide resin with the extender and optional monofunctional reactant and for the reaction of an epoxide group of the resin with an aliphatic amine group of a compound with an tridentate amine ligand include any that activate an oxirane ring, such as tertiary amines or quaternary ammonium salts (e.g., benzyldimethylamine, dimethylaminocyclohexane, triethylamine, N-methylimidazole, tetramethyl ammonium bromide, and tetrabutyl ammonium hydroxide.), tin and/or phosphorous complex salts (e.g., $(CH_3)_3SNI$, $(CH_3)_4PI$, triphenylphosphine, ethyltriphenyl phosphonium iodide, tetrabutyl phosphonium iodide) and so on. It is known in the art that tertiary amine catalysts may be preferred with some reactants. The reaction may be carried out at a temperature of from about 100° C. to about 350° C. (in other embodiments 160° C. to 250° C.) in solvent or neat. Suitable solvents include, without limitation, inert organic solvent such as a ketone, including methyl isobutyl ketone and methyl amyl ketone, aromatic solvents such as toluene, xylene, Aromatic 100, and Aromatic 150, and esters, such as butyl acetate, n-propyl acetate, hexyl acetate.

The epoxy resin may be reacted with the triamine compound providing the tridentate amine ligand during or after reaction of the polyepoxide resin with the extender and optional monofunctional reactant. The epoxy resin may be reacted with a secondary amine group the triamine compound and optionally a monofunctional reactant such as those already described.

The epoxy resin may be reacted with other amine compounds to introduce further amine groups onto the resin during or after reaction of the polyepoxide with the extender. Additional amine functionality for a cathodically electrodepositable resin may be introduced by reaction of the polyepoxide resin with an extender having a tertiary amine group or with a monofunctional reactant having a tertiary amine group. The amine functionality may be introduced after reaction of the polyepoxide and extender when the product is epoxide-functional by reaction of the epoxide-functional product with a reactant having a tertiary amine Suitable, nonlimiting examples of extenders and monofunctional reactants having an amine group that may be used include diethanolamine, dipropanolamine, diisopropanolamine, dibutanolamine, diisobutanolamine, diglycolamine, methylethanolamine, dimethylaminopropylamine, diethylaminopropylamine, dimethylaminoethylamine, N-aminoethylpiperazine, aminopropylmorpholine, tetramethyldipropylenetriamine, methylamine, ethylamine, dimethylamine, dibutylamine, ethylenediamine, diethylenetriamine, triethylenetetramine, dimethylaminobutylamine, diethylaminopropylamine, diethylaminobutylamine, dipropylamine, methylbutylamine, methylethanolamine, aminoethylethanolamine, aminopropylmonomethylethanolamine, polyoxyalkylene amines. and compounds having a primary amine group that has been protected by forming a ketimine. The epoxy resin with its amine functionality may cathodically electrodeposited. The epoxy resin having an tridentate amine ligand may also be combined in the electrocoat coating composition binder with a second resin that is cathodically electrodepositable.

In a first particular embodiment, bisphenol A, the diglycidyl ether of bisphenol A, and phenol are reacted in a first step to form a epoxide functional extended resin; in a second step, the epoxide functional extended resin is reacted with diethanolamine, dimethylaminopropylamine, and 3,3'-bisimino(N,N-dimethylpropylamine), to form an amine-functional, tridentate amine ligand-containing epoxy resin. This resin is combined with desired other components and the amine functionality is at least partially neutralized with an acid, then dispersed in an aqueous medium to make a binder emulsion. Further materials may be added in forming the electrocoat coating composition, as described below.

In a second embodiment, the tridentate amine ligand-containing resin is a vinyl polymer, such as an acrylic polymer. The tridentate amine ligand-containing acrylic polymer may be prepared by polymerization of a comonomer having a tridentate amine ligand or by reaction of an acrylic polymer having an epoxide group with a secondary amine of the triamine compound. Nonlimiting examples of monomers that may be reacted with the triamine before polymerization or that may be polymerized to provide an epoxide group to be reacted with the triamine compound after polymerization include addition polymerizable monomers having epoxide groups such as glycidyl acrylate, glycidyl methacryale, and allyl glycidyl ether.

Vinyl or acrylic resins may also incorporate other amine-containing monomers, such as N,N'-dimethylaminoethyl methacrylate tert-butylaminoethyl methacrylate. 2-vinylpyridine, 4-vinylpyridine, or vinylpyrrolidine. Alternatively, epoxide groups may be incorporated by including an epoxide-functional monomer such as glycidyl acrylate, glycidyl methacrylate, or allyl glycidyl ether in the polymerization reaction, then be made cathodically electrodepositable by reaction of the epoxide groups with amines as previously described for the epoxy resins.

A monomer that will provide functionality for crosslinking, in other words a monomer having a group reactive with a crosslinker in the binder, is generally copolymerized in forming the vinyl or acrylic polymer. Among suitable monomers are monomers having an active hydrogen group such as hydroxyalkyl acrylates and hydroxyalkyl methacrylates. Also useful for providing crosslinking groups are the acid-, amine-, or epoxide-functional monomers already mentioned.

The monomer bearing the tridentate amine ligand or epoxide group that will be reacted with the triamine compound to provide the tridentate amine ligand and any optional monomer bearing another amine group and/or monomer bearing a group for crosslinking the coating may be polymerized with one or more other ethylenically unsaturated monomers. Such monomers for copolymerization are known in the art. Illustrative examples include, without limitation, alkyl esters of acrylic or methacrylic acid, e.g., methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, diesters of maleic, fumaric, crotonic, isocrotonic, vinylacetic, and itaconic acids, and the like; and vinyl monomers such as styrene, t-butyl styrene, alpha-methyl styrene, vinyl toluene and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed.

The binder including the tridentate amine ligand-containing resin is used to prepare an electrocoat coating composition (also known as an electrocoat bath) that may also include a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these. In general, a binder is prepared comprising the tridentate amine ligand-containing resin, then the binder is dispersed in an aqueous medium by salting ionizable amine groups present in the binder. The optional metal oxide and optional additional pigments and/or fillers may be predispersed in a resin before or after the binder is salted and water is added, or the metal oxide may be incorporated into the electrocoat coating composition using another dispersing resin, as described in more detail below. A second, electrodepositable resin may be included in the binder; the second, electrodepositable resin may be included in the binder even when the tridentate amine ligand-containing resin by itself would form a stable, electrodepositable binder dispersion. Generally, it is desirable to crosslink the electrodeposited coating to a cured coating layer, and a crosslinker (also called curing agent or crosslinking agent) is generally included in the binder for this purpose. The crosslinker may react under curing conditions with the tridentate amine ligand-containing resin, the optional second, electrodepositable resin, and/or an optional further resin included in the coating composition binder.

A second, electrodepositable resin may be an epoxy resin, vinyl resin such as an acrylic polymer, polyurethane, epoxy-modified polybutadiene, epoxy-modified polyisoprene, or other epoxy-modified rubber-based polymer, or combinations of these, in which the resin has amine functionality. Such epoxy and acrylic resins may be prepared according to the methods outlined above regarding preparation of the tridentate amine ligand-containing resin, without adducting the resin with the triamine compound or including the tridentate amine ligand-containing monomer in polymerization. Further details of preparation of all of these resins are readily available in the art, particularly in existing patent documents. Cationic polyurethanes may also be used. Such materials may be prepared by endcapping with, for example, an aminoalcohol or, in the case of the polyurethane, the same compound comprising a saltable amine group previously described may also be useful. Polybutadiene, polyisoprene, or other epoxy-modified rubber-based polymers can be used as the resin in the present invention. The epoxy-rubber can be capped with a compound comprising a saltable amine group.

In certain embodiments, the tridentate amine ligand-containing resin is present in an amount from about 0.01 to about 99% by weight of binder in the electrodeposition coating composition. The electrodepositable tridentate amine ligand-containing resin may be present in an amount from about 1 to about 90% by weight of binder or from about 5 to about 80% by weight of binder in the electrodeposition coating composition.

Generally the binder is thermosetting and further includes a crosslinker. The crosslinker is selected according to groups available on the resin or resins of the binder for crosslinking during curing of a coating layer formed on a substrate. The art describes many considerations in selecting crosslinkers. Crosslinkers that react with active hydrogen groups on the resin or resin(s) are most commonly used, and of these polyisocyanates (particularly blocked polyisocyanates) and aminoplasts may be mentioned in particular. Nonlimiting examples of aromatic, aliphatic or cycloaliphatic polyisocyanates include diphenylmethane-4,4'-diisocyanate (MDI), 2,4- or 2,6-toluene diisocyanate (TDI), p-phenylene diisocyanate, tetramethylene diisocyanate, hexamethylene diisocyanate, dicyclohexylmethane-4,4'-diisocyanate, isophorone diisocyanate, mixtures of phenylmethane-4,4'-diisocyanate, polymethylene polyphenylisocyanate, 2-isocyanatopropyl-cyclohexyl isocyanate, dicyclohexylmethane 2,4'-diisocyanate, 1,3-bis(iso-cyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl)-cyclohexane, and higher polyisocyanates such as triphenylmethane-4,4',4"-triisocyanate, or mixtures of these polyisocyanates. Suitable polyisocyantes also include polyisocyanates derived from these that containing isocyanurate, biuret, allophanate, iminooxadiazinedione, urethane, urea, or uretdione groups. Polyisocyanates containing urethane groups, for example, are obtained by reacting some of the isocyanate groups with polyols, such as trimethylolpropane, neopentyl glycol, and glycerol, for example. The isocyanate groups are reacted with a blocking agent. Examples of suitable blocking agents include phenol, cresol, xylenol, epsilon-caprolactam, delta-valerolactam, gamma-butyrolactam, diethyl malonate, dimethyl malonate, ethyl acetoacetate, methyl acetoacetate, alcohols such as methanol, ethanol, isopropanol, propanol, isobutanol, tert-butanol, butanol, glycol monoethers such as ethylene or propylene glycol monoethers, acid amides (e.g. acetoanilide), imides (e.g. succinimide), amines (e.g. diphenylamine), imidazole, urea, ethylene urea, 2-oxazolidone, ethylene imine, oximes (e.g. methylethyl ketoxime), and the like.

As understood by those skilled in the art, an aminoplast resin is formed by the reaction product of formaldehyde and amine where the preferred amine is a urea or a melamine. Although urea and melamine are the preferred amines, other amines such as triazines, triazoles, diazines, guanidines, or guanamines may also be used to prepare the aminoplast resins. Furthermore, although formaldehyde is preferred for forming the aminoplast resin, other aldehydes, such as acetaldehyde, crotonaldehyde, and benzaldehyde, may also be used. Nonlimiting examples of suitable aminoplast resins include monomeric or polymeric melamine-formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like.

The binder may include one or more additional resins. Nonlimiting examples of suitable additional resins include epoxy resins, polyesters, polyurethanes, vinyl resins such as acrylic polymers, and polybutadiene resins.

Optionally, plasticizer or solvents or both can be included in the elecrocoat coating composition. Nonlimiting examples of coalescing solvents include alcohols, glycol ethers, polyols, and ketones. Specific coalescing solvents include monobutyl and monohexyl ethers of ethylene glycol, phenyl ether of propylene glycol, monoalkyl ethers of ethylene glycol such as the monomethyl, monoethyl, monopropyl, and monobutyl ethers of ethylene glycol or propylene glycol; dialkyl ethers of ethylene glycol or propylene glycol such as ethylene glycol dimethyl ether and propylene glycol dimethyl ether; butyl carbitol; diacetone alcohol. Nonlimiting examples of plasticizers include ethylene or propylene oxide adducts of nonyl phenols, bisphenol A, cresol, or other such materials, or polyglycols based on ethylene oxide and/or propylene oxide. The amount of coalescing solvent is not critical and is generally up to 15 percent by weight, preferably about 0.5 to 5 percent by weight based on total weight of the resin solids. Plasticizers can be used at levels of up to 15 percent by weight resin solids.

The binder is emulsified in water in the presence of a salting acid. Nonlimiting examples of suitable acids include phosphoric acid, phosphonic acid, propionic acid, formic acid, acetic acid, lactic acid, or citric acid. The salting acid may be blended with the binder, mixed with the water, or both, before the binder is added to the water. The acid is used in an amount sufficient to neutralize at least enough of the ionizable resin groups to impart water-dispersibility to the binder. The ionizable groups may be fully neutralized; however, partial neutralization is usually sufficient to impart the required water-dispersibility. By saying that the resin is at least partially neutralized, we mean that at least one of the saltable groups of the binder is neutralized, and up to all of such groups may be neutralized. The degree of neutralization that is required to afford the requisite water-dispersibility for a particular binder will depend upon its composition, molecular weight of the resins, weight percent of amine-functional resin, and other such factors and can readily be determined by one of ordinary skill in the art through straightforward experimentation.

The binder emulsion is then used in preparing an electrocoat coating composition (or bath). The electrocoat bath may further include a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and any combination of these, and may include one or more other pigments. The metal oxide and optional additional pigments may be predispersed in the binder before or after the resin is salted and water is added, or the metal oxide and any optional additional pigment may be separately added as part of a pigment paste. The bath may contain any further desired materials such as coalescing aids, antifoaming aids, and other additives that may be added before or after emulsifying the resin.

The metal oxide is selected from the group consisting of bismuth oxide, vanadium oxide, manganese oxide, cobalt oxide, zinc oxide, strontium oxide, yttrium oxide, molybdenum oxide, zirconium oxide, lanthanum oxide, and oxides of the lanthanide series of elements. The metal oxide may of any available oxidation state of these metals. In various embodiments, the metal oxide comprises $Bi_2O_3$, $ZnO$, $Co_3O_4$, $CoO$, $Co_2O_3$, $MnO_2$, $MnO$, $Mn_3O_4$, $Mn_2O_3$, $Mn_2O_7$, $MoO_2$, $SrO$, $V_2O_5$, $VO$, $VO_2$, $Y_2O_3$, $ZrO_2$, $La_2O_3$, $Ce_2O_3$, $Pr_6O_{11}$, $Nd_2O_3$, $Pm_2O_3$, $Sm_2O_3$, $Eu_2O_3$, $Gd_2O_3$, $Tb_2O_3$, $Tb_4O_7$, $Dy_2O_3$, $Ho_2O_3$, $Er_2O_3$, $Tm_2O_3$, $Yb_2O_3$, $Lu_2O_3$, and combinations of these. In various embodiments, the metal oxide may be included in amounts of from about 0.01 to about 1 percent by weight, based on total binder solids weight.

Conventional pigments for electrocoat primers may also be incorporated into the electrocoat coating composition; nonlimiting examples of such pigments include titanium dioxide, ferric oxide, carbon black, aluminum silicate, precipitated barium sulfate, aluminum phosphomolybdate, strontium chromate, basic lead silicate and lead chromate. The metal oxide and any optional pigments may be dispersed using any suitable resin, such as a grind resin or a pigment dispersant, as is known in the art. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the total amount of pigment is 10-40 percent by weight of the nonvolatile material in the bath. In some embodiments, the total amount of pigment is 15 to 30 percent by weight of the nonvolatile material in the bath. Any of the pigments and fillers generally used in electrocoat primers may be included. Inorganic extenders such as clay and anticorrosion pigments are commonly included in addition to the metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements, and combinations of these.

The electrodeposition coating compositions can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®. Surfactants and wetting agents, when present, typically amount to up to 2 percent by weight resin solids.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

The electrocoat coating composition is electrodeposited onto a metallic substrate. The substrate may be, as some nonlimiting examples, cold-rolled steel, galvanized (zinc coated) steel, electrogalvanized steel, stainless steel, pickled steel, GALVANNEAL® GALVALUME®, and GALVAN® zinc-aluminum alloys coated upon steel, and combinations of these. Nonlimiting examples of useful non-ferrous metals include aluminum, zinc, magnesium and alloys of these. The electrodeposition of the coating preparations according to the invention may be carried out by known processes. The electrodeposition coating composition may be applied preferably to a dry film thickness of 10 to 35 μm. In one embodiment of the method, the electrically conductive substrate is unphosphated; that is, it is free of a phosphate pre-treatment. The article coated with the composition of the invention may be a metallic automotive part or body. A method of coating an electrically conductive substrate, such as a metal automotive vehicle body or part, comprises placing an electrically conductive substrate, cleaned but preferably not given a phosphate pre-treatment, into the electrocoat coating composition and, using the electrically conductive substrate as the cathode, passing a current through the electrocoat coating composition causing a coating layer to deposit onto the electrically conductive substrate. After application, the coated article is removed from the bath and rinsed with deionized water. The coating may be cured under appropriate conditions, for example by baking at from about 275° F. to about 375° F. for between about 15 and about 60 minutes, before applying an additional coating layer over the electrodeposited coating layer.

An automotive vehicle body may be electrocoated. The automotive vehicle body is cleaned, and the cleaned metal automotive vehicle body is electrocoated with an aqueous electrodeposition coating composition comprising the metal oxide and the phosphorylated resin.

One or more additional coating layers, such as a spray-applied primer-surfacer, single topcoat layer, or composite color coat (basecoat) and clearcoat layer, may be applied over the electrocoat layer. A single layer topcoat is also referred to as a topcoat enamel. In the automotive industry, the topcoat is typically a basecoat that is overcoated with a clearcoat layer. A primer surfacer and the topcoat enamel or basecoat and clearcoat composite topcoat may be waterborne, solventborne, or a powder coating, which may be a dry powder or an aqueous powder slurry.

The composite coating of the invention may have, as one layer, a primer coating layer, which may also be termed a primer-surfacer or filler coating layer. The primer coating layer can be formed from a solventborne composition, waterborne composition, or powder composition, including powder slurry composition. The primer composition preferably has a binder that is thermosetting, although thermoplastic binders are also known. Suitable thermosetting binders may have self-crosslinking polymers or resins, or may include a crosslinker reactive with a polymer or resin in the binder. Nonlimiting examples of suitable binder polymers or resins include acrylics, polyesters, and polyurethanes. Such polymers or resins may include as functional groups hydroxyl groups, carboxyl groups, anhydride groups, epoxide groups, carbamate groups, amine groups, and so on. Among suitable crosslinkers reactive with such groups are aminoplast resins (which are reactive with hydroxyl, carboxyl, carbamate, and amine groups), polyisocyanates, including blocked polyisocyanates (which are reactive with hydroxyl group and amine groups), polyepoxides (which are reactive with carboxyl, anhydride, hydroxyl, and amine groups), and polyacids and polyamines (which are reactive with epoxide groups). Examples of suitable primer compositions are disclosed, for example, in U.S. Pat. Nos. 7,338,989; 7,297,742; 6,916,877; 6,887,526; 6,727,316; 6,437,036; 6,413,642; 6,210,758; 6,099,899; 5,888,655; 5,866,259; 5,552,487; 5,536,785; 4,882,003; and 4,190,569, each assigned to BASF and each incorporated herein by reference.

The primer coating composition applied over the electrocoat primer may then be cured to form a primer coating layer. The electrocoat primer may be cured at the same time as the primer coating layer in a process known as "wet-on-wet" coating.

A topcoat composition may be applied over the electrocoat layer or primer coating layer and, preferably, cured to form a topcoat layer. In a preferred embodiment, the electrocoat layer or primer layer is coated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers. Coatings of this type are well-known in the art and include waterborne compositions, solventborne compositions, and powder and powder slurry compositions. Polymers known in the art to be useful in basecoat and clearcoat compositions include, without limitation, acrylics, vinyls, polyurethanes, polycarbonates, polyesters, alkyds, and polysiloxanes. Acrylics and polyurethanes are among preferred polymers for topcoat binders. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin. Examples of suitable topcoat compositions are disclosed, for example, in U.S. Pat. Nos. 7,375,174; 7,342,071; 7,297,749; 7,261,926; 7,226,971; 7,160,973; 7,151,133; 7,060,357; 7,045,588; 7,041,729; 6,995,208; 6,927,271; 6,914,096; 6,900,270; 6,818,303; 6,812,300; 6,780,909; 6,737,468; 6,652,919; 6,583,212; 6,462,144; 6,337,139; 6,165,618; 6,129,989; 6,001,424; 5,981,080; 5,855,964; 5,629,374; 5,601,879; 5,508,349; 5,502,101; 5,494,970; 5,281,443; and, each assigned to BASF and each incorporated herein by reference.

The further coating layers can be applied to the electrocoat coating layer according to any of a number of techniques well-known in the art. These include, for example, spray coating, dip coating, roll coating, curtain coating, and the like. For automotive applications, the further coating layer or layers are preferably applied by spray coating, particularly electrostatic spray methods. Coating layers of one mil or more are usually applied in two or more coats (passes), separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

A primer layer may be cured before the topcoat is applied. The cured primer layer may be from about 0.5 mil to about 2 mils thick, preferably from about 0.8 mils to about 1.2 mils thick.

Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

Alternatively the primer layer and the topcoat can be applied "wet-on-wet." For example, the primer composition can be applied, then the applied layer flashed; then the topcoat can be applied and flashed; then the primer and the topcoat can be cured at the same time. Again, the topcoat can include a basecoat layer and a clearcoat layer applied wet-on-wet. The primer layer can also be applied to an uncured electrocoat coating layer, and all layers cured together.

The coating compositions described are preferably cured with heat. Curing temperatures are preferably from about 70° C. to about 180° C., and particularly preferably from about 170° F. to about 200° F. for a topcoat or primer composition including an unblocked acid catalyst, or from about 240° F. to about 275° F. for a topcoat or primer composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following example. The example is merely illustrative and does not in any way limit the scope of the invention as described and claimed. All parts are parts by weight unless otherwise noted.

EXAMPLES

Preparation A: Preparation of Binder Emulsion with 3,3'-Iminobis(N,N-dimethylpropylamine)

The following materials are combined in a 3-L flask equipped with stirring and a heating mantle: diglycidyl ether of bisphenol A (DGEBA), (18.03 parts), bisphenol A (BPA), (4.1 parts) phenol (1.41 parts), and propylene glycol n-butyl ether (0.36 parts).

While stirring, the temperature is raised to 257° F. (125° C.). Subsequently, triphenylphosphine (0.04 parts) is added and the exotherm is recorded as 359.6° F. (182° C.). The mixture is then allowed to cool to 275° F. (135° C.), and a weight per epoxide (WPE) determination (target=525+/−25) is conducted after 1 hour and is 525. After cooling to 194° F. (90° C.) and turning off the heating mantle, 2.36 parts of Pluracol® 710R (sold by BASF Corporation) is added, then 1.73 parts of diethanolamine is introduced and the exotherm is recorded as 237.2° F. (114° C.). The reaction mixture is allowed to stir for an additional 30 minutes at 221° F. (105° C.) after reaching exotherm. The remaining unreacted epoxy groups are capped with 3-dimethylaminopropylamine (0.42 parts) and 3,3'-iminobis(N,N-dimethylpropylamine) (0.42 parts) at 221° F. (105° C.). The secondary amine addition resulted in an exotherm which was recorded as 291.2° F. (144° C.). The mixture is stirred for an additional hour at 275° F. (135° C.). A crosslinker (a blocked isocyanate based on polymeric MDI and monofunctional alcohols) (13.6 parts) is added. The mixture is stirred for 30 minutes at 221-230° F. (105-110° C.).

After achieving a homogeneous mixture, the resin and crosslinker, blend is added, under constant stirring, to an acid/water mixture of deionized water (34.95 parts) and formic acid (88%) (0.62 parts). After thoroughly mixing all components using a metal spatula, the solids are further reduced by addition of water (18.55 parts). A flow-additive package (2.51 parts) is added to the acid mixture. All raw materials, including the various solvents used above, are industrial grade and no further purifications are made.

Preparation B: Grinding Resin Having Tertiary Ammonium Groups

In accordance with EP 0 505 445 B1, an aqueous-organic grinding resin solution is prepared by reacting, in the first stage, 2598 parts of bisphenol A diglycidyl ether (epoxy equivalent weight (EEW) 188 g/eq), 787 parts of bisphenol A, 603 parts of dodecylphenol, and 206 parts of butyl glycol in a stainless steel reaction vessel in the presence of 4 parts of triphenylphosphine at 130° C. until an EEW of 865 g/eq is reached. In the course of cooling, the batch is diluted with 849 parts of butyl glycol and 1534 parts of D.E.R® 732 (polypropylene glycol diglycidyl ether, DOW Chemical, USA) and is reacted further at 90° C. with 266 parts of 2,2'aminoethoxyethanol and 212 parts of N,N-dimethylaminopropylamine. After two hours, the viscosity of the resin solution is constant (5.3 dPas; 40% in SOLVENON® PM (methoxypropanol), available from BASF AG, Germany; cone and plate viscometer at 23° C.). It is diluted with 1512 parts of butyl glycol and the base groups are partly neutralized with 201 parts of glacial acetic acid, and the product is diluted further with 1228 parts of deionized water and discharged. This gives a 60% strength aqueous-organic resin solution whose 10% dilution has a pH of 6.0. The resin solution is used in direct form for paste preparation.

Preparation C: Pigment Paste with Zirconium Oxide

A premix is first formed from 125 parts of water and 594 parts of the grinding resin of Preparation B. Then 7 parts of acetic acid, 9 parts of TETRONIC® 901, 8 parts of carbon black, 26 parts of zirconium oxide, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co./Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 µm and is adjusted to solids content with additional water. The obtained pigment paste has solids content: 67% by weight (1 hour at 110° C.).

Preparation D: Pigment Paste with Zinc Oxide

A premix is first formed from 125 parts of water and 594 parts of the grinding resin of Preparation B. Then 7 parts of acetic acid, 9 parts of TETRONIC® 901, 8 parts of carbon black, 17 parts of zinc oxide, 547 parts of titanium dioxide TI-PURE® R 900 (DuPont, USA), 44 parts of di-n-butyl tin oxide, 47 parts of bismuth subsalicylate, and 120 parts of ASP200 clay are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 µm and is adjusted to solids content with additional water. The obtained pigment paste has solids content: 67% by weight (1 hour at 110° C.).

Preparation E: Pigment Paste with Vanadium Oxide

A premix is first formed from 125 parts of water and 594 parts of the grinding resin of Preparation B. Then 7 parts of acetic acid, 9 parts of TETRONIC® 901, 8 parts of carbon black, 19 parts of vanadium oxide, 547 parts of titanium dioxide TI-PURE® R 900 (DuPont, USA), 44 parts of di-n-butyl tin oxide, 47 parts of bismuth subsalicylate, and 120 parts of ASP200 clay are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 67% by weight (1 hour at 110° C.).

Preparation F: Pigment Paste with Yttrium Oxide

A premix is first formed from 125 parts of water and 594 parts of the grinding resin of Preparation B. Then 7 parts of acetic acid, 9 parts of TETRONIC® 901, 8 parts of carbon black, 23 parts of yttrium oxide, 547 parts of titanium dioxide TI-PURE® R 900 (DuPont, USA), 44 parts of di-n-butyl tin oxide, 47 parts of bismuth subsalicylate, and 120 parts of ASP200 clay are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 67% by weight (1 hour at 110° C.).

Preparation G: Pigment Paste with Cobalt Oxide

A premix is first formed from 125 parts of water and 594 parts of the grinding resin of Preparation B. Then 7 parts of acetic acid, 9 parts of TETRONIC® 901, 8 parts of carbon black, 17 parts of cobalt oxide, 547 parts of titanium dioxide TI-PURE® R 900 (DuPont, USA), 44 parts of di-n-butyl tin oxide, 47 parts of bismuth subsalicylate, and 120 parts of ASP200 clay are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 67% by weight (1 hour at 110° C.).

Preparation H: Pigment Paste with Molybdenum Oxide

A premix is first formed from 125 parts of water and 594 parts of the grinding resin of Preparation B. Then 7 parts of acetic acid, 9 parts of TETRONIC® 901, 8 parts of carbon black, 26 parts of molybdenum oxide, 547 parts of titanium dioxide TI-PURE® R 900 (DuPont, USA), 44 parts of di-n-butyl tin oxide, 47 parts of bismuth subsalicylate, and 120 parts of ASP200 clay are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 67% by weight (1 hour at 110° C.).

Preparation I: Pigment Paste

For this purpose, a premix is first formed from 1897 parts of water and 1750 parts of the grinding resin solution of Preparation B. Then 21 parts of Disperbyk® 110 (Byk-Chemie GmbH/Germany), 14 parts of Lanco Wax®. PE W 1555 (Langer & Co./Germany), 42 parts of carbon black, 420 parts of aluminum hydrosilicate ASP 200 clay (Langer & Co./Germany), 2667 parts of titanium dioxide TI-PURE® R 900 (DuPont, USA) and 189 parts of di-n-butyl tin oxide are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. A separation-stable pigment paste is obtained. Solids content: 60.0% by weight (½ h at 180° C.).

Example 1

An electrocoat bath is prepared by combining 998 parts by weight Preparation A, 146 parts by weight Preparation C, and 1356 parts by weight deionized water. The water and Preparation A resin emulsion are combined in a container with constant stirring, and Preparation B is added with stirring. The bath solid contents are 19% by weight.

Example 2

An electrocoat bath is prepared by combining 998 parts by weight Preparation A, 151 parts by weight Preparation I, and 1351 parts by weight deionized water. The water and Preparation A resin emulsion are combined in a container with constant stirring, and Preparation B is added with stirring. The bath solid contents are 19% by weight.

Examples 1 and 2 are tested by coating both phosphated and bare cold rolled steel 4-inch-by-6-inch test panels at 100 to 225 volts (0.5 ampere) in Example at bath temperatures from 88-98° F. (31-36.7° C.) for 2.2 minutes and baking the coated panels for 28 minutes at 350° F. (177° C.). The deposited, baked coating has a filmbuild of about 0.8 mil (20 μm). Three panels were coated for each temperature and substrate.

Control panels were prepared as described above but using U32AD500 (commercial product sold by BASF Corporation).

In one test, after baking, each panel is scribed directly down the middle and tested by corrosion test (GMW15288). The description of GMW15288 is as follows: On a Monday, each panel is held at 60° C. for one hour in an air-circulating oven and is then subjected to a cold cabinet at −25° C. for 30 minutes. Following, the panels are immersed for 15 minutes in a 5 wt. % NaCl solution in water (saline solution). After removal, the panels are allowed to air dry for 75 minutes at room temperature. The panels are then transferred to a humidity cabinet (60° C., 85% humidity) with an air flow not exceeding 15 m/ft across the panel and held for 21 hours. From Tuesday to Friday, the panels are immersed again in the saline solution for 15 minutes, allowed to air dry to 75 minutes at room temperature, and then returned to the humidity cabinet (22 hours). On Saturday and Sunday the panels remain in the humidity cabinet. The entire exposure sequence from Monday to the following Monday constitutes 5 cycles. The test is then repeated for a total of 20 cycles. After completion, each panel is rinsed with water and scraped with a metal spatula. The corrosion is measured as the average of scribe width of selected points along the scribe length.

In another test, after baking, each panel is scribed and tested in accordance with ISO 9227:2006E (& GMW3286) in Neutral Salt Spray (NSS). Testing is conducted continuously for 1000 hours by the panel being subjected to a spray of sodium chloride solution with a concentration of 50 gm/l at 35° C. After completion, each panel is rinsed with water and scraped with a metal spatula. The corrosion is measured as the average of scribe width of selected points along the scribe length.

In another test, after baking, each panel is scribed directly down the middle and tested in accordance with GMW14872. The test description is as follows: For 8 hours the test panels are subjected to contaminant spray of salt solution consists of 0.5% NaCl, 0.1% $CaCl_2$ and 0.075% $NaHCO_3$ at 25° C. and 45% relative humidity (RH). Next the test panels are subjected to 49° C. and a RH of 100% for 8 hours, followed by a dry stage where panels are subjected to 60° C. at <30% RH for 8 hours. The cycle is repeated until cold rolled steel (CRS) (per SAEJ2329 CRIE, uncoated) coupons reach 3.9 gm weight loss. After completion, each panel is rinsed with water and scraped with a metal spatula. The corrosion is measured as the average of scribe width of selected points along the scribe length.

TABLE

| | Results on bare cold rolled steel | | |
|---|---|---|---|
| System | GMW15288 ave mm Scribe Width | GMW14872 ave mm Scribe Width | GMW3286 ave mm Scribe Width |
| Example 1 | 12.1 | 9.5 | 9.5 |
| Example 2 | 11.6 | 9.1 | 8.6 |
| Control | 14.2 | 12.8 | 11 |

Example 3

An electrocoat bath is prepared by combining 998 parts by weight Preparation A, 151 parts by weight Preparation D, and 1351 parts by weight deionized water. The water and Preparation A resin emulsion are combined in a container with constant stirring, and Preparation D is added with stirring. The bath solid contents are 19% by weight.

Example 4

An electrocoat bath is prepared by combining 998 parts by weight Preparation A, 151 parts by weight Preparation E, and 1351 parts by weight deionized water. The water and Preparation A resin emulsion are combined in a container with constant stirring, and Preparation E is added with stirring. The bath solid contents are 19% by weight.

Example 5

An electrocoat bath is prepared by combining 998 parts by weight Preparation A, 151 parts by weight Preparation F, and 1351 parts by weight deionized water. The water and Preparation A resin emulsion are combined in a container with constant stirring, and Preparation F is added with stirring. The bath solid contents are 19% by weight.

Example 6

An electrocoat bath is prepared by combining 998 parts by weight Preparation A, 151 parts by weight Preparation G, and 1351 parts by weight deionized water. The water and Preparation A resin emulsion are combined in a container with constant stirring, and Preparation G is added with stirring. The bath solid contents are 19% by weight.

Example 7

An electrocoat bath is prepared by combining 998 parts by weight Preparation A, 151 parts by weight Preparation H, and 1351 parts by weight deionized water. The water and Preparation A resin emulsion are combined in a container with constant stirring, and Preparation H is added with stirring. The bath solid contents are 19% by weight.

Preparing Coated Panels. Both phosphated and bare cold rolled steel 4-inch-by-6-inch panels are plated from Examples 3-7 at 100-225 volts (0.5 ampere) in the Example (one of Examples 3-7) at bath temperatures from 88-98° F. (31-36.7° C.) for 2.2 minutes and the coated panels are baked for 28 minutes at 350° F. (177° C.). The deposited, baked coating has a filmbuild of about 0.8 mil (20 μm).

The description is merely exemplary in nature and, thus, variations that do not depart from the gist of the disclosure are a part of the invention. Variations are not to be regarded as a departure from the spirit and scope of the disclosure.

What is claimed is:

1. An aqueous coating composition comprising a cathodically electrodepositable binder, the binder comprising a tridentate amine ligand-containing resin.

2. An aqueous coating composition according to claim 1, wherein the tridentate amine ligand-containing resin is an epoxy resin.

3. An aqueous coating composition according to claim 2, wherein the epoxy resin is based on bisphenol A.

4. An aqueous coating composition according to claim 1, wherein the tridentate amine ligand has a structure —N(—R'—$NR_2$)$_2$, in which R' is an alkyl group having from one up to four carbon atoms and optionally having an ether oxygen and each R is independently an alkyl of 1 to 4 carbon atoms.

5. An aqueous coating composition according to claim 4, wherein the tridentate amine ligand-containing resin comprises a plurality of tridentate amine ligands.

6. An aqueous coating composition according to claim 4, wherein R' is an ethylene or propylene group and each R is a methyl group.

7. An aqueous coating composition according to claim 1, wherein the tridentate amine ligand-containing resin is a vinyl resin.

8. An aqueous coating composition according to claim 1, wherein the tridentate amine ligand-containing resin comprises a further amine group other than the tridentate amine ligand.

9. An aqueous coating composition according to claim 1, wherein the binder comprises from about 0.01 to about 99% by weight of the tridentate amine ligand-containing resin.

10. An aqueous coating composition according to claim 1, further comprising a crosslinker reactive with the tridentate amine ligand-containing resin.

11. An aqueous coating composition according to claim 10, further comprising a second amine-functional resin reactive with the crosslinker, wherein the second amine-functional resin does not include tridentate amine ligands.

12. An aqueous coating composition according to claim 1, further comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements and combinations thereof.

13. An aqueous coating composition according to claim 12, wherein the metal oxide is selected from the group consisting of bismuth oxide, vanadium oxide, manganese oxide, cobalt oxide, zinc oxide, yttrium oxide, molybdenum oxide, zirconium oxide, and combinations thereof.

14. An aqueous coating composition according to claim 12, comprising from about 0.01 to about 1 percent by weight of the metal oxide based on total binder solids weight.

15. A method of coating a metal automotive vehicle body, comprising:
(a) cleaning the metal automotive vehicle body;
(b) placing the cleaned metal automotive vehicle body into an aqueous coating composition according to claim 1;
(c) connecting the metal automotive vehicle body as an electrode in an electric circuit and passing a current through the aqueous electrodeposition coating composition to deposit a coating layer onto the metal automotive vehicle body.

16. A method of coating an electrically conductive substrate according to claim 15, wherein the metal automotive vehicle body is free of a phosphate pre-treatment.

17. A method of coating an electrically conductive substrate according to claim 15, wherein the tridentate amine ligand-containing resin is an epoxy resin.

18. A method of coating an electrically conductive substrate according to claim 15, further comprising a metal oxide selected from the group consisting of bismuth oxide, vanadium oxide, manganese oxide, cobalt oxide, zinc oxide, strontium oxide, yttrium oxide, molybdenum oxide, zirconium oxide, lanthanum oxide, oxides of the lanthanide series of elements and combinations thereof.

19. A method of coating an electrically conductive substrate according to claim 18, wherein the metal oxide is selected from the group consisting of bismuth oxide, vanadium oxide, manganese oxide, cobalt oxide, zinc oxide, yttrium oxide, molybdenum oxide, zirconium oxide, and combinations thereof.

20. A method of coating an electrically conductive substrate according to claim 18, wherein the aqueous coating composition comprises from about 0.01 to about 1 percent by weight of the metal oxide based on total binder solids weight.

* * * * *